(12) United States Patent
Kim et al.

(10) Patent No.: US 8,204,151 B2
(45) Date of Patent: Jun. 19, 2012

(54) METHODS AND APPARATUS TO GENERATE MULTIPLE ANTENNAS TRANSMIT PRECODING CODEBOOK

(75) Inventors: Taejoon Kim, West Lafayette, IN (US); Jianzhong Zhang, Irving, TX (US); Bruno Clerckx, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 710 days.

(21) Appl. No.: 12/319,528

(22) Filed: Jan. 8, 2009

(65) Prior Publication Data

US 2010/0034308 A1    Feb. 11, 2010

Related U.S. Application Data

(60) Provisional application No. 61/188,087, filed on Aug. 6, 2008, provisional application No. 61/198,213, filed on Nov. 4, 2008.

(51) Int. Cl.
*H04L 27/00* (2006.01)
(52) U.S. Cl. ....................................... 375/299
(58) Field of Classification Search ................ 375/299, 375/130, 267, 295, 296, 347, 349; 370/302, 370/270, 301, 321; 332/104, 170, 159
See application file for complete search history.

(56) References Cited

U.S. PATENT DOCUMENTS

| | | |
|---|---|---|
| 2006/0045062 A1 | 3/2006 | Gorokhov et al. |
| 2006/0094373 A1 | 5/2006 | Hottinen |
| 2007/0191066 A1 | 8/2007 | Khojastepour et al. |
| 2008/0256163 A1* | 10/2008 | Clerckx et al. ............ 708/607 |

FOREIGN PATENT DOCUMENTS

| | | |
|---|---|---|
| EP | 1909406 A2 | 4/2008 |
| RU | 2292116 (C2) | 1/2007 |
| RU | 2321949 (C1) | 4/2008 |
| WO | WO 03/023995 A1 | 3/2003 |

OTHER PUBLICATIONS

International Search Report dated Feb. 26, 2010 in connection with International Patent Application No. PCT/KR2009/004359.

* cited by examiner

*Primary Examiner* — Khai Tran

(57) ABSTRACT

A device and method for generating a codebook. The device includes a generator. The codebook generator is configured to generate a precoding codebook using an 8-PSK alphabet-based 4 bits 4 TX and 8 TX antennas for use in a closed-loop SU-MIMO scheme. According to aspects of the present disclosure, it is possible to generate a precoding codebook for use in 8 Transmission Antenna systems.

3 Claims, 12 Drawing Sheets

| BASE MATRIX | CW INDEX | RANK1 | RANK2 | RANK3 | RANK4 | RANK5 | RANK6 | RANK7 | RANK8 |
|---|---|---|---|---|---|---|---|---|---|
| $W_1=\frac{1}{\sqrt{8}}H_{1,1,1,1}(1,1,1,1)$ | 1 | 1 | 1 5 | 1 3 5 | 1357 | 12357 | 123567 | 1234567 | 12345678 |
| | 2 | 2 | 2 4 | 1 2 4 | 1247 | 12478 | 124578 | 1245678 | N/A |
| | 3 | 3 | 1 3 | 1 2 3 | 1234 | 12345 | 123457 | 1234578 | N/A |
| | 4 | 4 | 4 8 | 1 4 8 | 1458 | 14568 | 124568 | 1234568 | N/A |
| | 5 | 5 | 5 7 | 5 6 7 | 5678 | 15678 | 135678 | 1235678 | N/A |
| | 6 | 6 | 2 6 | 2 4 6 | 2468 | 24678 | 124678 | 1234678 | N/A |
| | 7 | 7 | 3 7 | 2 3 7 | 2367 | 23467 | 234678 | 2345678 | N/A |
| | 8 | 8 | 6 8 | 5 6 8 | 3568 | 34568 | 134568 | 1345678 | N/A |
| $W_2=\frac{1}{\sqrt{8}}H_{3,3,3,3}(3,3,3,3)$ | 9 | 1 | 1 3 | 1 3 5 | 1357 | 12357 | 123567 | 1234567 | 12345678 |
| | 10 | 2 | 2 4 | 2 4 6 | 2468 | 23468 | 234678 | 2345678 | N/A |
| | 11 | 3 | 3 5 | 3 5 7 | 3457 | 34567 | 134567 | 1345678 | N/A |
| | 12 | 4 | 4 6 | 4 6 8 | 4678 | 14678 | 124678 | 1245678 | N/A |
| | 13 | 5 | 5 7 | 1 5 7 | 1257 | 12567 | 124567 | 1234567 | N/A |
| | 14 | 6 | 6 8 | 2 6 8 | 2678 | 23678 | 123678 | 1235678 | N/A |
| | 15 | 7 | 1 7 | 1 3 7 | 1237 | 12378 | 123578 | 1234578 | N/A |
| | 16 | 8 | 2 8 | 2 4 8 | 2348 | 23458 | 234568 | 1234568 | N/A |

FIG. 8

| BASE MATRIX | CW INDEX | RANK1 | RANK2 | RANK3 | RANK4 | RANK5 | RANK6 | RANK7 | RANK8 |
|---|---|---|---|---|---|---|---|---|---|
| $W_1 = \frac{1}{\sqrt{8}} H_{1,1,3}(1,3,2,4)$ | 1 | 1 | 1 5 | 1 3 5 | 1537 | 12357 | 123567 | 1234567 | 12345678 |
| | 2 | 2 | 2 6 | 2 4 6 | 2468 | 12468 | 124568 | 1234568 | N/A |
| | 3 | 3 | 3 7 | 2 3 7 | 3726 | 23467 | 234678 | 1234678 | N/A |
| | 4 | 4 | 4 8 | 1 4 8 | 4815 | 13458 | 134578 | 1234578 | N/A |
| | 5 | 5 | 5 3 | 3 5 7 | 5372 | 23567 | 234567 | 2345678 | N/A |
| | 6 | 6 | 4 6 | 4 6 8 | 6481 | 14568 | 134568 | 1345678 | N/A |
| | 7 | 7 | 2 7 | 2 6 7 | 7264 | 24678 | 124678 | 1245678 | N/A |
| | 8 | 8 | 8 1 | 1 5 8 | 8153 | 13578 | 123578 | 1235678 | N/A |
| $W_2 = \frac{1}{\sqrt{8}} H_{3,3,4}(1,3,2,4)$ | 9 | 1 | 1 3 | 1 2 3 | 1234 | 12345 | 123456 | 1234567 | 12345678 |
| | 10 | 2 | 2 4 | 1 2 4 | 1246 | 12456 | 124567 | 1245678 | N/A |
| | 11 | 3 | 2 3 | 2 3 4 | 2437 | 23478 | 123478 | 1234578 | N/A |
| | 12 | 4 | 1 4 | 1 3 4 | 1348 | 13478 | 134678 | 1234678 | N/A |
| | 13 | 5 | 5 8 | 5 7 8 | 3578 | 23578 | 235678 | 1235678 | N/A |
| | 14 | 6 | 6 7 | 6 7 8 | 4678 | 14678 | 145678 | 1345678 | N/A |
| | 15 | 7 | 5 7 | 5 7 6 | 5678 | 35678 | 345678 | 2345678 | N/A |
| | 16 | 8 | 6 8 | 5 6 8 | 1568 | 13568 | 123568 | 1234568 | N/A |

FIG. 9

| BASE MATRIX | CW INDEX | RANK1 | RANK2 | RANK3 | RANK4 | RANK5 | RANK6 | RANK7 | RANK8 |
|---|---|---|---|---|---|---|---|---|---|
| $W_1 = \frac{1}{\sqrt{8}} H_{1,1,1}(1,1,1,1)$ | 1 | 1 | 15 | 135 | 1357 | 13567 | 123567 | 1234567 | 12345678 |
| | 2 | 2 | 26 | 246 | 2468 | 24568 | 124568 | 1234568 | N/A |
| | 3 | 7 | 37 | 137 | 1378 | 13478 | 134578 | 1345678 | N/A |
| | 4 | 8 | 48 | 248 | 2478 | 23478 | 234678 | 2345678 | N/A |
| $W_2 = \frac{1}{\sqrt{8}} H_{2,4,4}(4,4,4,4)$ | 5 | 1 | 13 | 134 | 1234 | 12347 | 123467 | 1234567 | 12345678 |
| | 6 | 2 | 24 | 245 | 2457 | 23457 | 234578 | 2345678 | N/A |
| | 7 | 7 | 57 | 578 | 1578 | 14578 | 145678 | 1345678 | N/A |
| | 8 | 8 | 68 | 168 | 1683 | 13568 | 123568 | 1234568 | N/A |
| $W_3 = \frac{1}{\sqrt{8}} H_{3,3,3}(3,3,3,3)$ | 9 | 3 | 37 | 137 | 1378 | 13478 | 134578 | 1234578 | 12345678 |
| | 10 | 4 | 48 | 248 | 1248 | 12458 | 124568 | 1245678 | N/A |
| | 11 | 5 | 15 | 157 | 1357 | 13567 | 123567 | 1235678 | N/A |
| | 12 | 6 | 26 | 268 | 2468 | 23468 | 234678 | 1234678 | N/A |
| $W_4 = \frac{1}{\sqrt{8}} H_{4,2,2}(2,2,2,2)$ | 13 | 1 | 13 | 134 | 1234 | 12345 | 123458 | 1234568 | 12345678 |
| | 14 | 2 | 24 | 246 | 2456 | 24567 | 124567 | 1234567 | N/A |
| | 15 | 7 | 57 | 578 | 5678 | 25678 | 235678 | 2345678 | N/A |
| | 16 | 8 | 68 | 168 | 1678 | 13678 | 134678 | 1345678 | N/A |

FIG. 10

| BASE MATRIX | CW INDEX | RANK1 | RANK2 | RANK3 | RANK4 | RANK5 | RANK6 | RANK7 | RANK8 |
|---|---|---|---|---|---|---|---|---|---|
| $W_1=\frac{1}{\sqrt{8}}H_{1,1,1}(1,1,1,1)$ | 1 | 1 | 1 5 | 1 3 5 | 1357 | 13578 | 134578 | 1345678 | 12345678 |
|  | 2 | 2 | 2 6 | 2 4 6 | 2468 | 23468 | 234678 | 1234678 | N/A |
| $W_2=\frac{1}{\sqrt{8}}H_{1,4,4}(3,3,3,3)$ | 3 | 1 | 1 5 | 1 3 5 | 1357 | 13578 | 134578 | 1234578 | 12345678 |
|  | 4 | 2 | 2 6 | 2 4 6 | 2468 | 23468 | 234678 | 1234678 | N/A |
| $W_3=\frac{1}{\sqrt{8}}H_{2,1,1}(1,1,1,1)$ | 5 | 3 | 1 3 | 1 2 3 | 1234 | 12348 | 123458 | 1234568 | 12345678 |
|  | 6 | 4 | 2 4 | 1 2 4 | 1247 | 12457 | 124578 | 1245678 | N/A |
| $W_4=\frac{1}{\sqrt{8}}H_{4,2,2}(2,2,2,2)$ | 7 | 1 | 1 3 | 1 2 3 | 1234 | 12348 | 123468 | 1234678 | 12345678 |
|  | 8 | 2 | 2 4 | 1 2 4 | 1247 | 12457 | 123457 | 1234567 | N/A |
| $W_5=\frac{1}{\sqrt{8}}H_{1,3,3}(3,3,3,3)$ | 9 | 3 | 3 7 | 2 3 7 | 2367 | 12367 | 123567 | 1235678 | 12345678 |
|  | 10 | 4 | 4 8 | 1 4 8 | 1458 | 14568 | 124578 | 1234578 | N/A |
| $W_6=\frac{1}{\sqrt{8}}H_{1,4,4}(3,3,3,3)$ | 11 | 5 | 5 7 | 5 6 7 | 5678 | 15678 | 135678 | 1235678 | 12345678 |
|  | 12 | 6 | 6 8 | 5 6 8 | 3568 | 23568 | 234568 | 1234568 | N/A |
| $W_7=\frac{1}{\sqrt{8}}H_{1,4,4}(1,1,1,1)$ | 13 | 7 | 5 7 | 5 7 8 | 4578 | 34578 | 234578 | 1234578 | 12345678 |
|  | 14 | 8 | 6 8 | 1 6 8 | 1468 | 14568 | 134568 | 1345678 | N/A |
| $W_8=\frac{1}{\sqrt{8}}H_{4,3,3}(4,4,3,3)$ | 15 | 7 | 5 7 | 5 7 8 | 5678 | 35678 | 345678 | 2345678 | 12345678 |
|  | 16 | 8 | 6 8 | 1 6 8 | 1268 | 12368 | 123568 | 1234568 | N/A |

FIG. 11

| BASE MATRIX | CW INDEX | RANK1 | RANK2 | RANK3 | RANK4 |
|---|---|---|---|---|---|
| $W_1=\frac{1}{\sqrt{8}}H_{1,1,1}(1,3,2,4)$ | 1 | 1 | 1 2 | 1 2 3 | 1 2 3 4 |
| | 2 | 2 | 3 4 | 3 4 2 | 3 4 2 5 |
| | 3 | 3 | 5 6 | 5 6 7 | 5 6 7 8 |
| | 4 | 4 | 7 8 | 7 8 6 | 7 8 6 1 |
| | 5 | 5 | 1 5 | 1 5 3 | 1 5 3 7 |
| | 6 | 6 | 3 7 | 2 6 4 | 2 6 4 8 |
| | 7 | 7 | 2 6 | 3 7 2 | 3 7 2 5 |
| | 8 | 8 | 4 8 | 4 8 1 | 4 8 1 6 |
| $W_1=\frac{1}{\sqrt{8}}H_{1,1,4}(1,3,2,4)$ | 9 | 1 | 1 3 | 1 2 3 | 1 2 3 4 |
| | 10 | 2 | 2 4 | 1 2 4 | 1 2 4 6 |
| | 11 | 3 | 2 3 | 2 3 4 | 2 4 3 7 |
| | 12 | 4 | 1 4 | 1 3 4 | 1 3 4 8 |
| | 13 | 5 | 5 8 | 5 7 8 | 3 5 7 8 |
| | 14 | 6 | 6 7 | 6 7 8 | 4 6 7 8 |
| | 15 | 7 | 5 7 | 5 7 6 | 5 6 7 8 |
| | 16 | 8 | 6 8 | 5 6 8 | 1 5 6 8 |

FIG. 12

| BASE MATRIX | CW INDEX | RANK1 | RANK2 | RANK3 | RANK4 |
|---|---|---|---|---|---|
| $W_1=\frac{1}{\sqrt{8}}H_{1,1,1}(1,3,2,4)$ | 1 | 1 | 1 5 | 1 3 5 | 1 5 3 7 |
| | 2 | 2 | 2 6 | 2 4 6 | 2 6 4 8 |
| | 3 | 3 | 3 7 | 2 3 7 | 3 7 2 6 |
| | 4 | 4 | 4 8 | 1 4 8 | 4 8 1 5 |
| | 5 | 5 | 5 3 | 3 5 7 | 5 3 7 2 |
| | 6 | 6 | 4 6 | 4 6 8 | 6 4 8 1 |
| | 7 | 7 | 2 7 | 2 6 7 | 7 2 6 4 |
| | 8 | 8 | 8 1 | 1 5 8 | 8 1 5 3 |
| $W_1=\frac{1}{\sqrt{8}}H_{1,1,4}(1,3,2,4)$ | 9 | 1 | 1 2 | 1 2 3 | 1 2 3 4 |
| | 10 | 2 | 3 4 | 2 3 4 | 2 3 4 5 |
| | 11 | 3 | 5 6 | 5 6 7 | 5 6 7 8 |
| | 12 | 4 | 7 8 | 6 7 8 | 6 7 8 1 |
| | 13 | 5 | 1 3 | 1 3 7 | 1 3 7 8 |
| | 14 | 6 | 5 7 | 5 7 1 | 5 7 1 4 |
| | 15 | 7 | 2 4 | 2 4 8 | 2 4 8 1 |
| | 16 | 8 | 6 8 | 6 8 2 | 6 8 2 1 |

FIG. 13

METHODS AND APPARATUS TO GENERATE MULTIPLE ANTENNAS TRANSMIT PRECODING CODEBOOK

CROSS-REFERENCE TO RELATED APPLICATION(S) AND CLAIM OF PRIORITY

The present application is related to U.S. Provisional Patent No. 61/188,087, filed Aug. 6, 2008, entitled "METHODS AND APPARATUS TO GENERATE MULTIPLE ANTENNAS TRANSMIT PRECODING CODEBOOK" and U.S. Provisional Patent 61/198,213, filed Nov. 4, 2008, entitled "PRECODING CODEBOOK FOR WIRELESS COMMUNICATIONS SYSTEMS". Provisional Patent No. 61/188,087 is assigned to the assignee of the present application and is hereby incorporated by reference into the present application as if fully set forth herein. Provisional Patent No. 61/198,213 is assigned to the assignee of the present application and is hereby incorporated by reference into the present application as if fully set forth herein. The present application hereby claims priority under 35 U.S.C. §119(e) to U.S. Provisional Patent Nos. 61/188,087 and 61/198,213.

TECHNICAL FIELD OF THE INVENTION

The present application relates generally to a Multiple Input Multiple Output (MIMO) communications system and, more specifically, to codebook information in the MIMO communications system.

BACKGROUND OF THE INVENTION

A multiple input multiple output (MIMO) communications system is a system that can transmit and receive data between at least one base station and at least one subscriber station. Since each base station and each subscriber station includes a plurality of antennas, the MIMO scheme makes it possible to improve the efficiency of transmitting and receiving data.

A codebook based pre-coding MIMO can provide significant spectral efficiency gain in the downlink closed-loop MIMO. In the IEEE 802.16e and 3GPP LTE standards, a four transmitter (4 TX) antenna limited feedback based closed-loop MIMO configuration is supported. In IEEE 802.16m and 3GPP LTE Advanced standards, in order to provide peak spectral efficiency, an eight transmitter (8 TX) antenna configuration is proposed as a prominent preceding closed loop MIMO downlink system.

There are several requirements for a codebook. The codebook is designed based on the complexity and the performance for the 4 TX single-user MIMO (SU-MIMO). The basic assumption of the codebook design was for uncorrelated channel. In the real communication environment, the uncorrelated channel implies that the antennas are spaced at least a half wavelength (0.5λ) at the subscriber station and the antennas are spaced at least ten wavelengths (10λ) at the base station. Given the whole array dimension (usually we assume 10 wavelengths), each transmit antenna is likely to be correlated. Thus, the baseline of the codebook design often is for correlated array.

In the 3GPP LTE standard, a 4 TX codebook is generated based on a Householder reflection given the same dimensional 16 generating vectors. Therefore, a large memory size to store 64 elements of the generating vectors is required. The Householder reflection provides a four by four (4×4) unitary matrix with constant modulus property. However, the four-dimensional Householder reflection is a special case where the constant modulus property is preserved. In the other dimension, the constant modulus property of the Householder reflection is broken. Since the Constant modulus is the strongest requirement for the system, Householder reflection is not an appropriate approach for designing codebooks including other dimensions.

Therefore, there is a need in the art for an improved method and apparatus for constructing Constant Modulus codebook. In particular, there is a need for a Constant Modulus codebook that is capable of being utilized in MIMO systems including four or more transmitters.

SUMMARY OF THE INVENTION

A system capable of wireless communications is provided. The system comprises a base station for communicating with a plurality or subscriber stations, wherein the base station transmits via a multiple input, multiple output (MIMO) antenna system using an 8-PSK alphabet-based 4 bits 4 TX and 8 TX antennas preceding codebook used for closed-loop SU-MIMO scheme.

A device for generating a codebook to transmit and receive data to and from a plurality of subscriber stations via a multiple input, multiple output (MIMO) system is provided. The device includes a codebook generator configured to generate a precoding codebook using an 8-PSK alphabet-based 4 bits 4 TX and 8 TX antennas for a closed-loop SU-MIMO scheme.

A method for generating a codebook to transmit and receive data via a multiple input, multiple output (MIMO) antenna system is provided. The method includes using an 8-PSK alphabet-based 4 bits 4 TX and 8 TX antennas precoding codebook used for closed-loop SU-MIMO scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a first Codebook according to embodiments of the present disclosure;

FIG. 9 illustrates a second Codebook according to embodiments of the present disclosure;

FIG. 10 illustrates a third Codebook according to embodiments of the present disclosure;

FIG. 11 illustrates a fourth Codebook according to embodiments of the present disclosure; and FIGS. 12 and 13 illustrate first and second column subset assignments of the second Codebook according to embodiments of the present disclosure.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
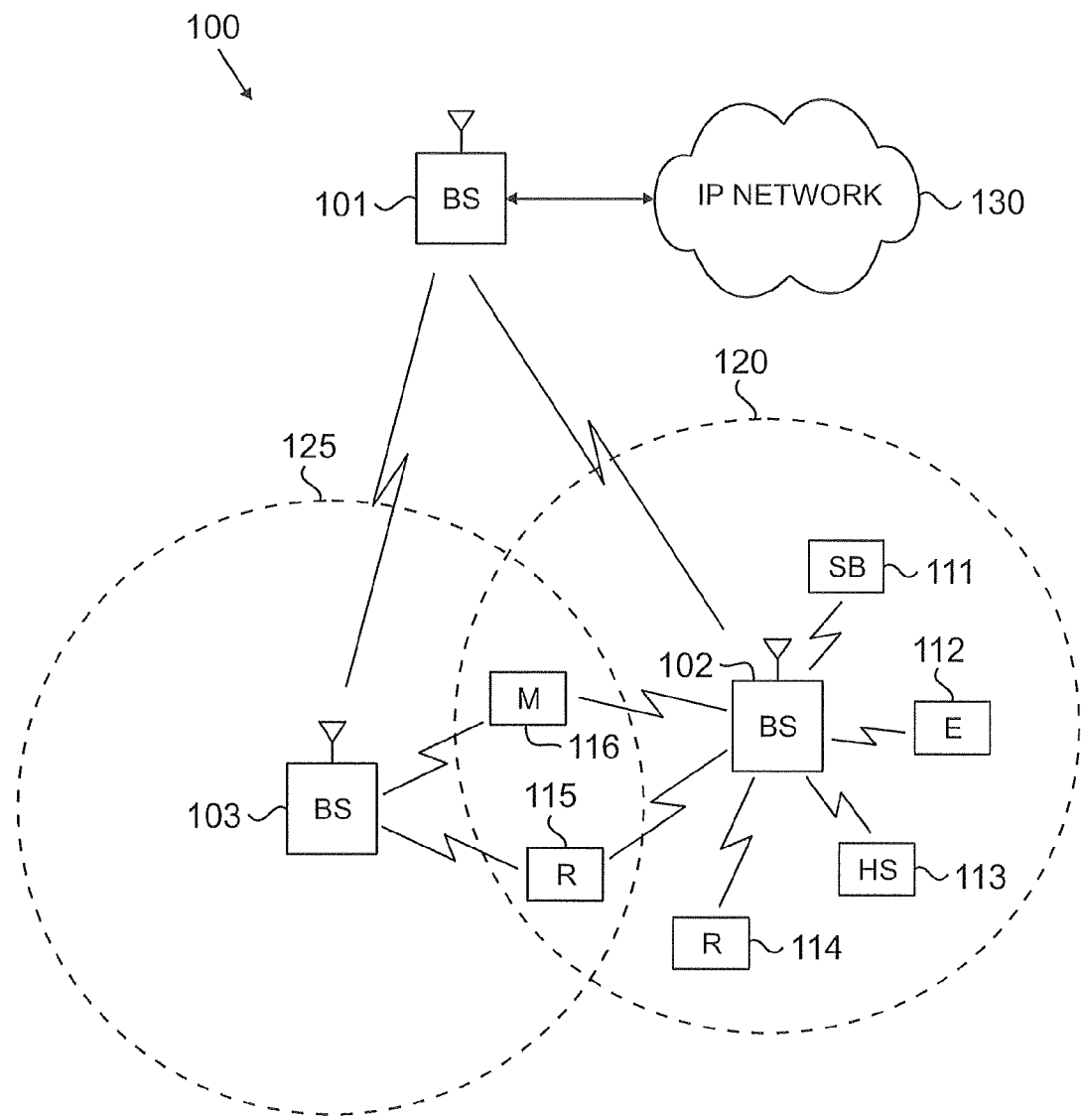
FIG. 1 illustrates exemplary wireless network that is capable of decoding data streams according to one embodiment of the present disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
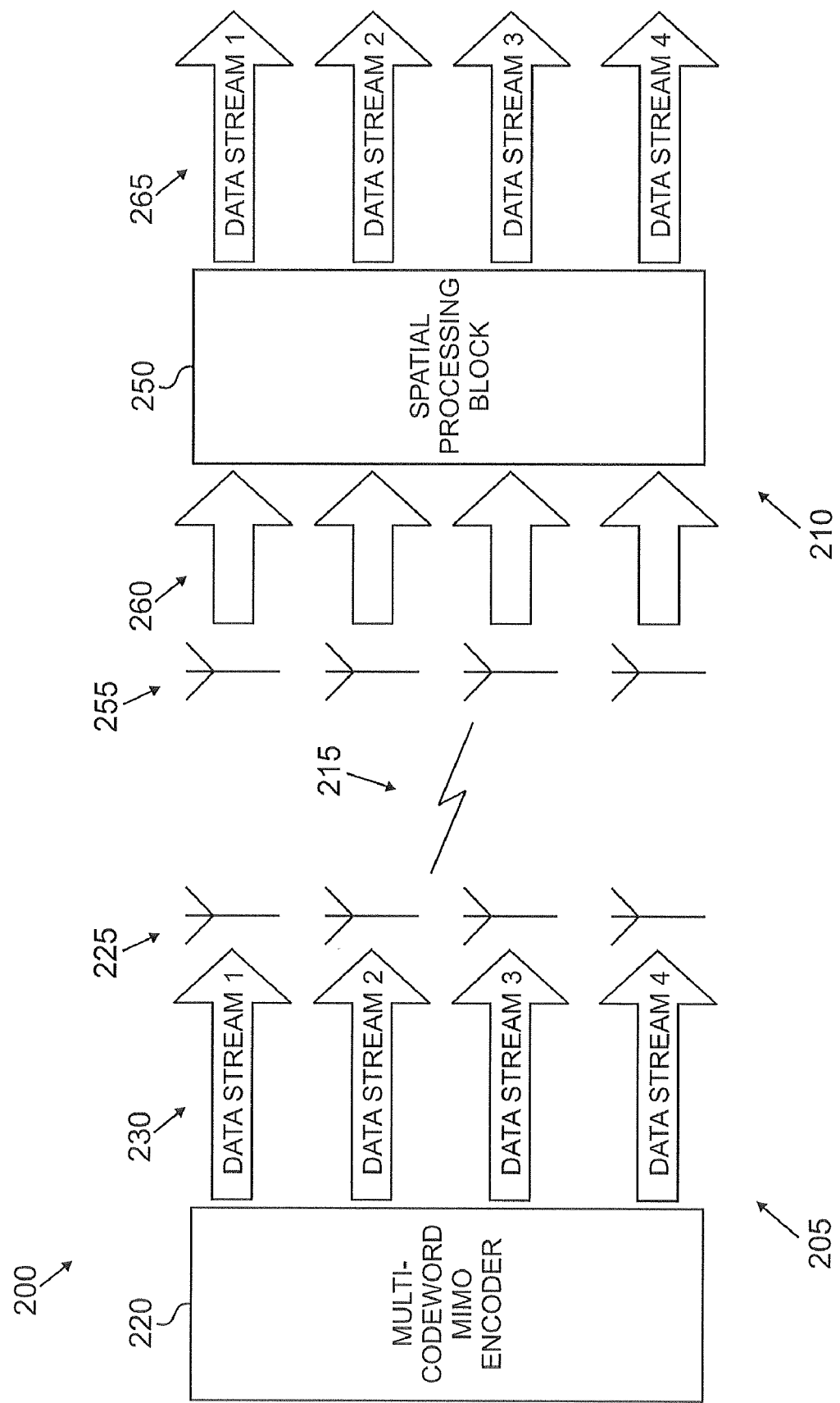
FIG. 2 illustrates a MIMO system that is capable of decoding data streams according to an embodiment of the present disclosure.

FIG. 2 illustrates a MIMO system 200 that is capable of decoding data streams according to an embodiment of the present disclosure. MIMO system 200 comprises a transmitter 205 and a receiver 210 that are operable to communicate over a wireless interface 215.

Transmitter 205 comprises a multi-codeword MIMO encoder 220 and a plurality of antennas 225, each of which is operable to transmit a different data stream 230 generated by encoder 220. Receiver 210 comprises a spatial processing block 250 and a plurality of antennas 255, each of which is operable to receive a combined data stream 260 from a plurality of sources including antennas 225 of transmitter 205. Spatial processing block 250 is operable to decode the combined data stream 260 into data streams 265, which are substantially identical to the data streams 230 transmitted by antennas 225.

Spatial processing block 250 is operable to decode data streams 265 from the combined data stream 260 using an MMSE-SIC procedure that selects an order for decoding the streams 265 based on a decoding prediction metric (DPM) for each stream 265. The DPM for each data stream 265 is based on a strength-related characteristic associated with the data stream 265. Thus, for example, the DPM may be based on a capacity of the channel associated with the data stream 265, an effective signal-to-interference and noise ratio (SINR) for the data stream 265 and/or any other suitable strength-related characteristic. Using this process for decoding, receiver 210 is able to provide better performance than a receiver that decodes streams in a random order without introducing the complexity of a receiver that searches all possible decoding orders to find an optimum decoding order.

Figure 3:
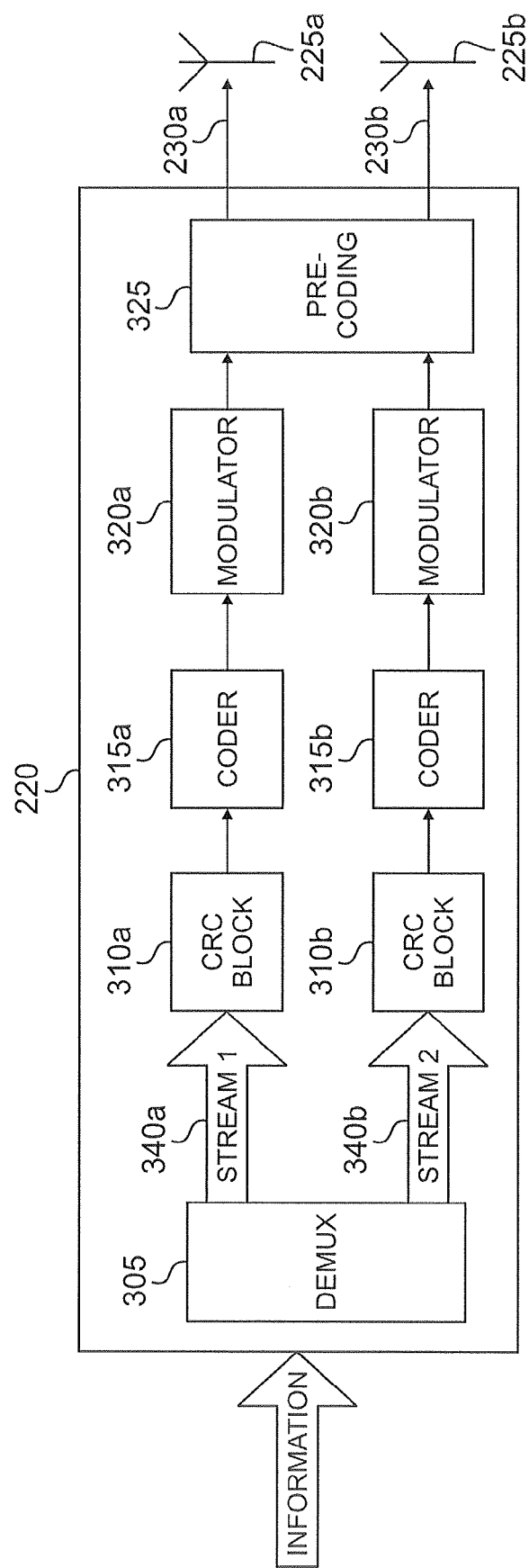
FIG. 3 illustrates details of multi-codeword MIMO encoder according to an embodiment of the present disclosure.

FIG. 3 illustrates details of multi-codeword MIMO encoder 220 according to an embodiment of the present disclosure. For this embodiment, encoder 220 comprises a demultiplexer (demux) 305, a plurality of cyclic redundancy code (CRC) blocks 310, a plurality of coders 315, a plurality of modulators 320, and a pre-coder 325. Encoder 220 is operable to receive an information block and to generate data streams 230 based on the information block for transmission over antennas 225. Although the illustrated embodiment shows two sets of components 310, 315 and 320 to generate two streams 230a-b for transmission by two antennas 225a-b, it will be understood that encoder 220 may comprise any suitable number of component sets 310, 315, 320 and 325 based on any suitable number of streams 230 to be generated.

Demultiplexer 305 is operable to demultiplex the information block into a plurality of smaller information blocks, or streams 340. Each CRC block 310 is operable to add CRC data to the associated stream 340. Following the addition of CRC data, each coder 315 is operable to code the stream 340 and each modulator 320 is operable to modulate the coded stream 340. After coding and modulation, the resulting streams, which are equivalent to data streams 230, are processed through a preceding algorithm 325 and transmitted from separate antennas 225.

Because encoder 220 is a multi-codeword MIMO encoder, different modulation and coding may be used on each of the individual streams 340. Thus, for example, coder 315a may perform different coding from coder 315b and modulator 320a may perform different modulation from modulator 320b. Using multi-codeword transmission, a CRC check may optionally be performed on each of the codewords before the codeword is canceled form the overall signal at receiver 210. When this check is performed, interference propagation may be avoided in the cancellation process by ensuring that only correctly received codewords are canceled.

Precoding 325 is used for multi-layer beamforming in order to maximize the throughput performance of a multiple receive antenna system. Multiple streams of the signals are emitted from the transmit antennas with independent and appropriate weighting per each antenna such that the link through-put is maximized at the receiver output. Precoding processes for multi-codeword MIMO can be sub-divided into linear and nonlinear preceding types. Linear precoding approaches can achieve reasonable throughput performance with lower complexity relateved to nonlinear precoding approaches. Linear preceding includes unitary precoding and zero-forcing (hereinafter "ZF") precoding. Nonlinear precoding can achieve near optimal capacity at the expense of complexity. Nonlinear precoding is designed based on the concept of Dirty paper coding (hereinafter "DPC") which shows that any known interference at the transmitter can be subtracted without the penalty of radio resources if the optimal preceding scheme can be applied on the transmit signal. Precoding may be performed through a computation process of multiplying a matrix, including a plurality of spatial beams, by a vector corresponding to a signal packet.

Figure 4:
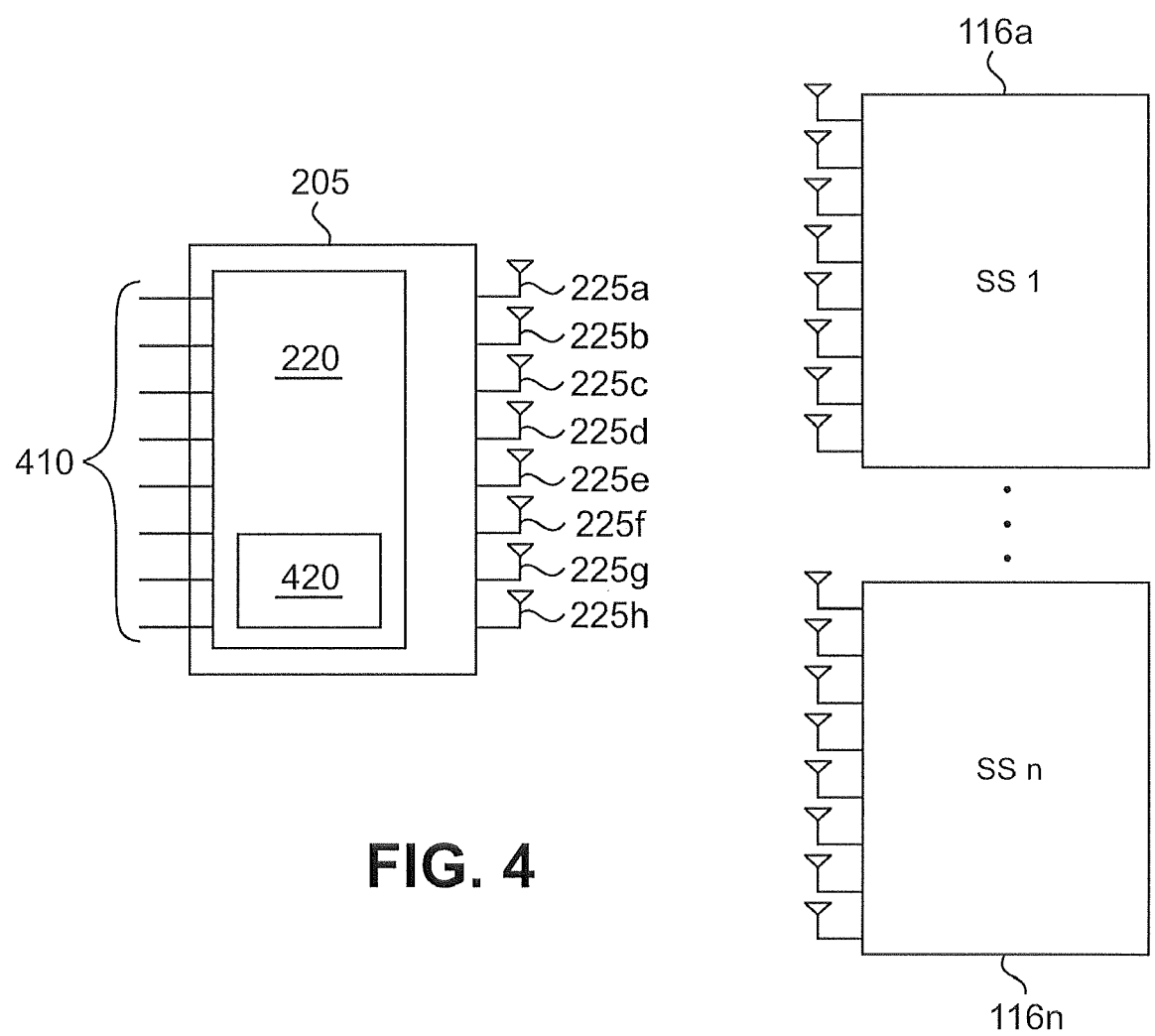
FIG. 4 illustrates a MIMO communication system according to embodiments of the present disclosure.

FIG. 4 illustrates a MIMO communication system according to embodiments of the present disclosure. The embodiment of the MIMO communication system 400 shown in FIG. 4 is for illustration only. Other embodiments of the MIMO communication system 400 could be used without departing from the scope of this disclosure.

The MIMO communication system (MIMO system) 400 includes the transmitter 205 and a plurality of subscriber stations SS 116a-116n. The MIMO system 400 is configured to transmit a signal packet 410 to any of the plurality of subscriber stations SS1 116a-SSn 116n. The signal packet 410 is transmitted, for example, to SS1 116a via encoder 220 in transmitter 205 and the plurality of antennas 225a-225h.

The encoder 200 (e.g., in the preceding 325) multiplies a matrix, including the plurality of spatial beams, by a vector corresponding to the signal packet 410. Each of the spatial beams may correspond to a spatial direction that is transmitted from a base station to each of the subscriber stations SS1 116a-SSn 116n. In SU-MIMO systems, the encoder 220 determines the number of data streams transmitted to any one of the plurality of subscriber stations SS1 116a-SSn 116n. For example, each vector may correspond to a data stream transmitted to SS1 116a.

A codebook 420 generator in the encoder 200 generates the matrix (also referred to as a precoder matrix and preceding matrix) to be multiplied by the encoder. A number of rows or columns of the matrix to be multiplied by the encoder 220 may be determined by the number of transmitting antennas 225 at the base station 102. Therefore, when eight transmitting antenna 225a-225h are utilized by the transmitter 205, the matrix may have eight rows. When eight transmitting antenna 225a-225h are utilized, a maximum of eight data streams in the signal packet 410 may be simultaneously transmitted. The number of data streams that is transmitted may be adjusted to any one of one (1) through eight (8), depending on the communication environment. The adjusted number of data streams that is simultaneously transmitted is referred to as the transmission rank. Further, when eight receiving antenna are utilized by the SS 116 (e.g., SS1 116a), the matrix may have eight columns.

Embodiments of the present disclosure provide that the plurality of subscriber stations SS1 116a-SSn 116n are configured to compute a communication channel feature using a pilot signal. The subscriber station (e.g., SS1 116a) transmits information about the computed communication channel feature to the base station 102 to determine the matrix based on the transmitted information.

Embodiments of the present disclosure further provide that a codeword can be utilized to represent elements (e.g., row and column positions) within the matrix H. Each codeword is a sequence of symbols assembled in accordance with the specific rules of the code and assigned a unique meaning. Accordingly, a first codeword corresponds to element $h_{11}$, a second codeword corresponds to a second element $h_{12}$ etc.

In order to gain maximal benefit (e.g., improved diversity and multiplexing gain) with MIMO antennas, some embodiments provide that the antennas 225a-225h are spaced at least a half wavelength (0.5λ) at the SS 116 and the antennas are spaced at least ten wavelengths (10λ) at the base station. To efficiently decrease the necessary physical space required, dual-polarized antennas are employed. Co-located dual-polarized antenna systems provide a cost-space efficient alternative to current MIMO antenna systems. In such embodiments, the designed 8 TX codebook provides reasonable spectral efficiency with dual-polarized antennas.

In some embodiments, the codebook is designed to have a constant modulus (CM). A constant modulus occurs when elements in one rank of a matrix equal respective elements in other ranks of the matrix. For example, element $h_{12}$ of Rank1 equals $h_{12}$ of rank two (Rank2). The CM property, as the baseline of the codebook, ensures a Power Amplifier (PA) balance. With the CM constraint, the codebook design corresponds to the design of equal gain transmission precoders.

In some embodiments, rank adaptation is used to improve the spectral efficiency of low geometry users. In such embodiments, the codebook is designed with a nested property. A nested property occurs when all of the lower rank codewords are reused for constructing higher rank codewords. The nested property reduces the complexity to calculate the Channel Quality Indicator (CQI) when rank adaptation is performed.

The elements of the codeword matrix are chosen from an eight phase shift key (8-PSK) alphabet:

$$\left\{\pm 1, \pm j, \pm \frac{(1+j)}{\sqrt{2}}, \pm \frac{(-1+j)}{\sqrt{2}}\right\}.$$

Choosing the elements from the 8-PSK alphabet avoids the need for performing matrix multiplication in the CQI calculation.

In some embodiments, systematic generation is employed. In systematic generation, a large dimensional codeword is generated from a lower dimensional generating vector or matrix. Systematic generation decreases the memory required to store the generating vectors or matrices and a physical system dimension required to generate the codeword. In the 3GPP LTE standard, a 4 TX codebook is generated based on the Householder reflection given the same dimensional generating vectors. Therefore, a large memory size is required to store 64 entries of the 16 generating vectors. Embodiments of the present disclosure provide that only 16 entries of the four (4) generating matrices are required to be stored, regardless of the number of antennas utilized.

In one embodiment, a systematic codebook design methodology for the constraint M-PSK alphabet and for $2^n$-dimensional antennas is employed. For the M-PSK alphabet, a set of transformation matrices is defined by Equations 1 and 2 below:

$$\Gamma_M = \{T_1, T_2, \ldots, T_{M/2}\}, \text{where:} \quad [\text{Eqn. 1}]$$

$$T_i = \begin{bmatrix} 1 & 1 \\ e^{j2\pi(i-1)/M} & -e^{j2\pi(i-1)/M} \end{bmatrix} \text{ for } i = 1, 2, \ldots, M/2. \quad [\text{Eqn. 2}]$$

The $T_i$ forms a 2 by 2 (2×2) unitary matrix. The $T_i$ is used to transform the generation matrix that is used to construct the larger dimension matrix. Given a set of transformation matrix $\Gamma_M$ for M-PSK, several complex Hadamard (CH) transformations can be defined as follows. Given any two generating matrices, $V_1$ and $V_2 \in U^{m \times n}$, where $U^{m \times n}$ denotes an m×n dimensional matrix space whose columns are orthonormal to each other, a one-stage complex Hadamard (CH) transformation is defined by Equation 3 below:

$$H_i(V_1, V_2) \equiv (T_i \otimes I_m)[I_2(:,1) \otimes V_1, I_2(:,2) \otimes V_2] \quad [\text{Eqn. 3}]$$
$$= [T_i(:,1) \otimes V_1, T_i(:,2) \otimes V_2]$$
$$= W_i^{(1)}$$

In Equation 3, $I_m$ denotes the m-dimensional identity matrix, $H_i(V_1, V_2) \in U^{2m \times 2n}$, $\otimes$ denotes the Kronecker product, and the superscript in the resulting matrix $W_i^{(1)}$ denotes the number of the transformation stages.

Figure 5:
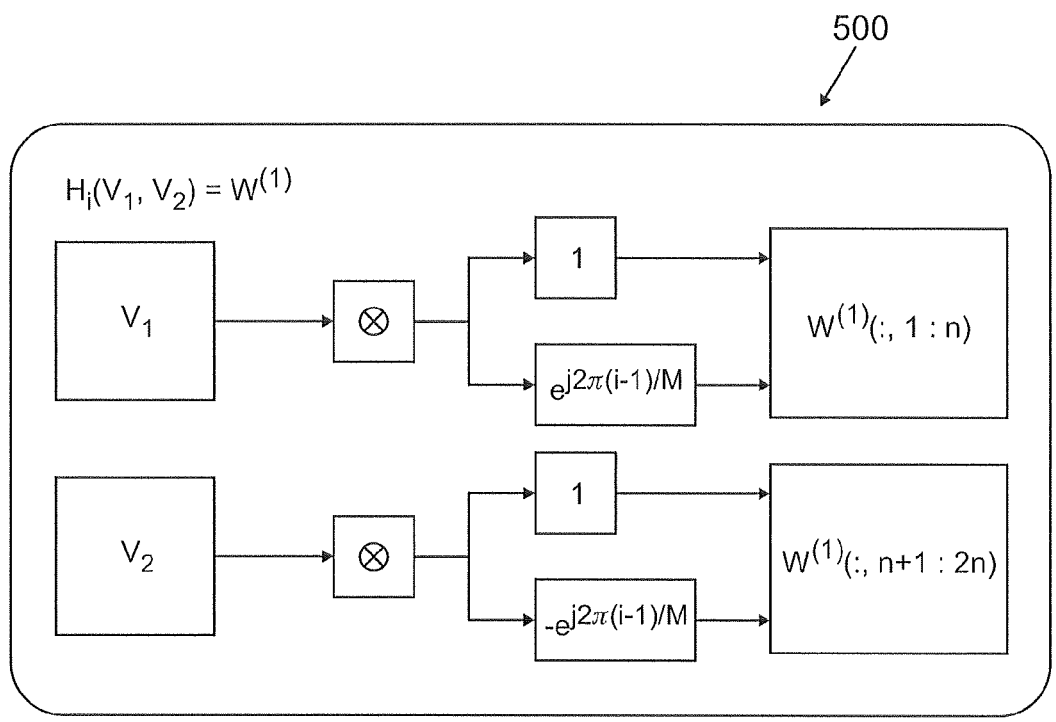
FIG. 5 illustrates the one-stage CH transformation based on M-PSK alphabet according to embodiments of the present disclosure.

FIG. 5 illustrates the one-stage CH transformation 500 based on M-PSK alphabet according to embodiments of the present disclosure. When i=1, the one-stage CH transformation 500 is equivalent to a real Hadamard transformation. Using the one-stage complex Hadamard transformation 500, a 2m×2n matrix with orthonormal columns is generated.

Figure 6:
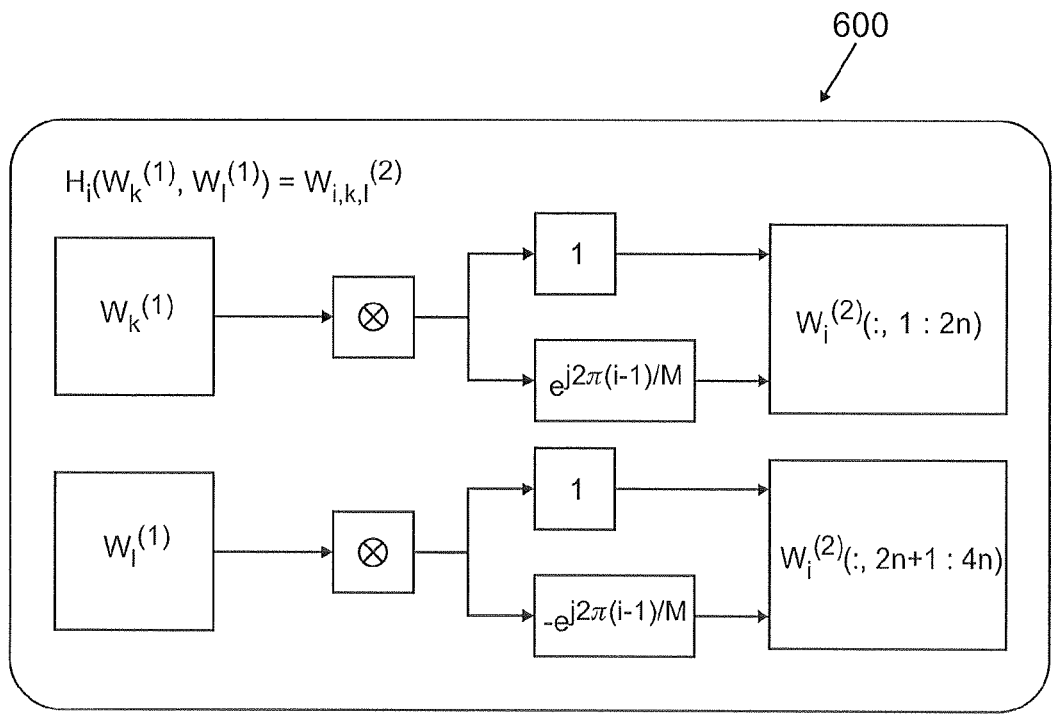
FIG. 6 illustrates a two-stage CH transformation based on a M-PSK alphabet according to embodiments of the present disclosure.

FIG. 6 illustrates a two-stage CH transformation based on a M-PSK alphabet according to embodiments of the present disclosure. In some embodiments, a two-stage complex Hadamard transformation 600 is utilized. Given any generating matrix $V_1$, $V_2$, $V_3$ and $V_4 \in U^{m \times n}$, the two stage complex Hadamard transformation is defined by Equation 4 below:

$$H_{i,k,l}(V_1, V_2, V_3, V_4) \equiv H_i(W_k^{(1)}, W_l^{(1)}) \quad [\text{Eqn. 4}]$$

$$= H_i(H_k(V_1, V_2), H_l(V_3, V_4))$$

$$= [T_i(:, 1) \otimes H_k(V_1, V_2),$$

$$T_i(:, 1) \otimes H_l(V_3, V_4)]$$

$$= (T_i(:, 1) \otimes [T_k(:, 1) \otimes V_1, T_k(:, 2) \otimes V_2],$$

$$T_i(:, 1) \otimes [T_l(:, 1) \otimes V_3, T_l(:, 2) \otimes V_4])$$

$$= W_i^{(2)}$$

In Equation 4, $1 \leq i,k,l \leq M/2$ and the resulting matrix $W_i^{(2)}$ forms a 4m×4n matrix with orthonormal columns.

Figure 7:
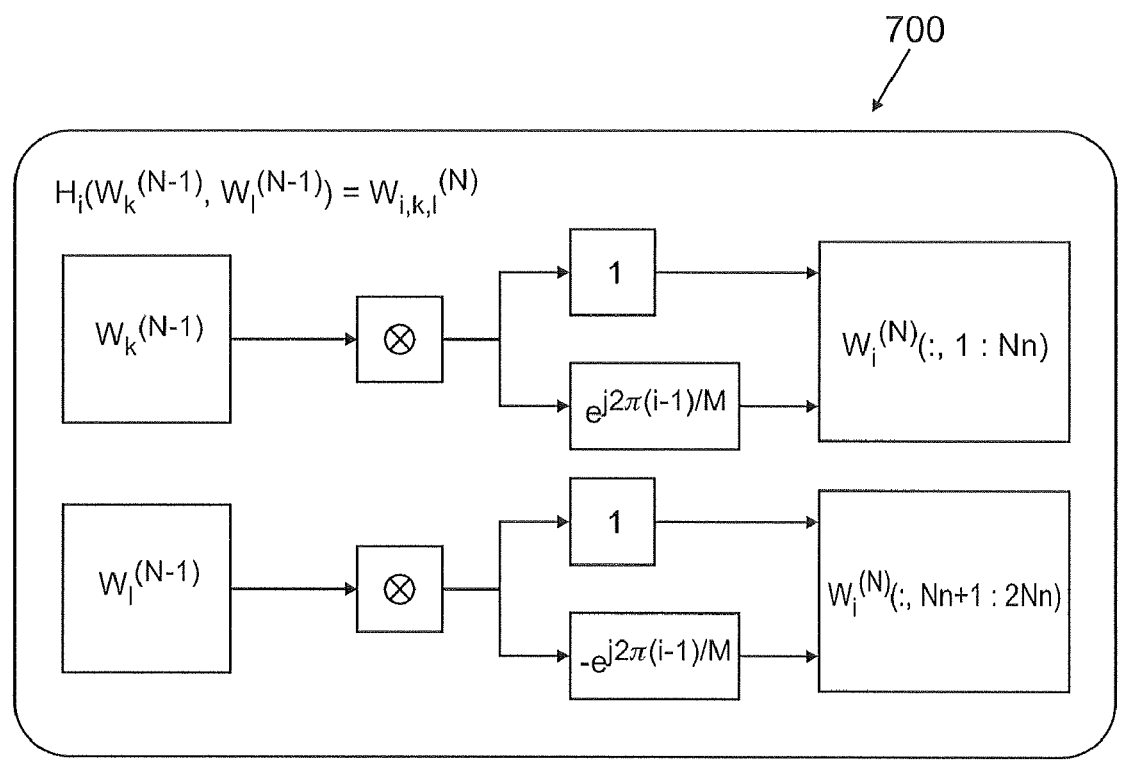
FIG. 7 illustrates a generalized N-stage CH transformation based on a M-PSK alphabet according to embodiments of the present disclosure.

This kind of extension can be performed to N-stage transformations to construct an Nm×Nn matrix by recursively applying the transformations. FIG. 7 illustrates a generalized N-stage CH transformation based on a M-PSK alphabet according to embodiments of the present disclosure.

Accordingly, if the entries for the generating matrix $V_j$ are selected from the set of M-PSK alphabets, then Equation 4 may be utilized to generate a set of Nm×Nn matrices with M-PSK entries. Additionally, a set of M-PSK generating matrices may be defined by constraining $V_j$ in $\Gamma_M$, (i.e., $V_j \in \Gamma_M$). Then, N-stage complex Hadamard transformation 700, defined for M-PSK alphabet, generates a set of $2^N \times 2^N$ unitary matrices with M-PSK alphabets. The resulting unitary matrix contains a rotation of the block diagonal matrix. This rotation provides a good channel matching property with the dual-polarized antennas given appropriate column subset selection for the different rank of transmissions.

In still additional embodiments, utilizing Equation 4, a DFT matrix may be constructed. A simple column permutation is performed to construct the DFT matrix. For example, the 4-dimensional DFT matrix can be constructed with the one-stage transformation as illustrated by Equations 5 and 6 below:

$$DFT_4 = \frac{1}{\sqrt{4}} H_1(T_1, T_3) P_4 \quad [\text{Eqn. 5}]$$

$$= \frac{1}{\sqrt{4}} [T_1(:, 1) \otimes T_1, T_1(:, 2) \otimes T_3] P_4,$$

In Equation 5, $P_4$ denotes the column permutation matrix:

$$P_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix}. \quad [\text{Eqn. 6}]$$

An 8-dimensional DFT matrix can also be constructed with the two-stages transformations using Equation 7 below:

$$DFT_8 = \frac{1}{\sqrt{8}} H_1(H_3(T_1, T_3), H_3(T_2, T_4)) P_8 \quad [\text{Eqn. 7}]$$

$$= \frac{1}{\sqrt{8}} (T_1(:, 1) \otimes [T_3(:, 1) \otimes T_1, T_3(:, 2) \otimes T_2],$$

$$T_1(:, 1) \otimes [T_3(:, 1) \otimes T_2, T_3(:, 2) \otimes T_4]) P_8.$$

In Equation 7, $P_8$ denotes the column permutation matrix:

$$P_8 = \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 0 & 0 & 1 & 0 & 0 \\ 0 & 0 & 0 & 1 & 0 & 0 & 0 & 0 \\ 0 & 0 & 0 & 0 & 0 & 0 & 0 & 1 \end{bmatrix}.$$

Since the effect of the column permutation matrix can be merged into the column subset strategy of the base matrix, the designed codebook may include the DFT matrix as a base matrix.

In another embodiment, a 4-bit 4 TX codebook with 8-PSK alphabet using the above unitary matrix construction method is generated. Given the nested property incorporated with rank adaptation, the matrix generator 420 constructs the transmit precoder as a column subset of the 4×4 unitary matrix. The matrix generator 420 utilizes the one-stage complex Hadamard transformation 500 to generate 4×4 base matrices. In such embodiment, the one-stage complex Hadamard transformation 500 is redefined as Equation 9 below:

$$H_i(m1, m2) \equiv H_i(T_{m1}, T_{m2}) \quad [\text{Eqn. 9}]$$

$$= [T_i(:, 1) \otimes T_{m1}, T_i(:, 2) \otimes T_{m2}]$$

In Equation 9, the generating matrices $T_{m1}$ and $T_{m2}$ are chosen in $\Gamma_8$. Further, m1 and m2 denote the index of the generating matrix. The four (4) transmission and generating matrices for 8-PSK alphabet are tabulated as illustrated in Table 1.

TABLE 1

8-PSK Generating Matrices

| Matrix index | Description |
|---|---|
| 1 | $\begin{bmatrix} 1 & 1 \\ 1 & -1 \end{bmatrix}$ |
| 2 | $\begin{bmatrix} 1 & 1 \\ \frac{1+j}{\sqrt{2}} & -\frac{1+j}{\sqrt{2}} \end{bmatrix}$ |
| 3 | $\begin{bmatrix} 1 & 1 \\ j & -j \end{bmatrix}$ |
| 4 | $\begin{bmatrix} 1 & 1 \\ \frac{-1+j}{\sqrt{2}} & -\frac{-1+j}{\sqrt{2}} \end{bmatrix}$ |

The mapping from the base matrix to codeword is illustrated in Table 2.

TABLE 2

4-bits 4 TX Precoding Matrices

| Base Matrix | CW Index | Rank1 | Rank2 | Rank3 | Rank4 |
|---|---|---|---|---|---|
| $W_1 = \frac{1}{\sqrt{4}} H_1(1,1)$ | 1 | $W_1(:,1)$ | $W_1(:,13)$ | $W_1(:,123)$ | $W_1(:,1234)$ |
| | 2 | $W_1(:,2)$ | $W_1(:,14)$ | $W_1(:,134)$ | $W_2(:,1234)$ |
| | 3 | $W_1(:,3)$ | $W_1(:,23)$ | $W_1(:,234)$ | $W_3(:,1234)$ |
| | 4 | $W_1(:,4)$ | $W_1(:,24)$ | $W_1(:,124)$ | $W_4(:,1234)$ |
| $W_2 = \frac{1}{\sqrt{4}} H_1(3,3)$ | 5 | $W_2(:,1)$ | $W_1(:,12)$ | $W_2(:,123)$ | n/a |
| | 6 | $W_2(:,2)$ | $W_2(:,13)$ | $W_2(:,134)$ | n/a |
| | 7 | $W_2(:,3)$ | $W_2(:,14)$ | $W_2(:,234)$ | n/a |
| | 8 | $W_2(:,4)$ | $W_1(:,23)$ | $W_2(:,124)$ | n/a |
| $W_3 = \frac{1}{\sqrt{4}} H_2(2,2)$ | 9 | $W_3(:,1)$ | $W_2(:,24)$ | $W_3(:,123)$ | n/a |
| | 10 | $W_3(:,2)$ | $W_2(:,12)$ | $W_3(:,134)$ | n/a |
| | 11 | $W_3(:,3)$ | $W_2(:,14)$ | $W_3(:,234)$ | n/a |
| | 12 | $W_3(:,4)$ | $W_2(:,12)$ | $W_3(:,124)$ | n/a |
| $W_4 = \frac{1}{\sqrt{4}} H_3(4,4)$ | 13 | $W_4(:,1)$ | $W_3(:,23)$ | $W_4(:,123)$ | n/a |
| | 14 | $W_4(:,2)$ | $W_4(:,14)$ | $W_4(:,134)$ | n/a |
| | 15 | $W_4(:,3)$ | $W_4(:,34)$ | $W_4(:,234)$ | n/a |
| | 16 | $W_4(:,4)$ | $W_4(:,23)$ | $W_4(:,124)$ | n/a |

The entries of four base matrices are given by Equations 10, 11, 12 and 13 below:

$$W_1 = \frac{1}{\sqrt{4}} H_1(1,1) = \frac{1}{\sqrt{4}} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad [\text{Eqn. 10}]$$

$$W_2 = \frac{1}{\sqrt{4}} H_1(3,3) = \frac{1}{\sqrt{4}} \begin{bmatrix} 1 & 1 & 1 & 1 \\ j & -j & j & -j \\ 1 & 1 & -1 & -1 \\ j & -j & -j & j \end{bmatrix} \quad [\text{Eqn. 11}]$$

$$W_3 = \frac{1}{\sqrt{4}} H_3(2,2) = \quad [\text{Eqn. 12}]$$

$$\frac{1}{\sqrt{4}} \begin{bmatrix} 1 & 1 & 1 & 1 \\ \frac{(1+j)}{\sqrt{2}} & -\frac{(1+j)}{\sqrt{2}} & \frac{(1+j)}{\sqrt{2}} & -\frac{(1+j)}{\sqrt{2}} \\ j & j & -j & -j \\ \frac{(-1+j)}{\sqrt{2}} & \frac{(1-j)}{\sqrt{2}} & \frac{(1-j)}{\sqrt{2}} & \frac{(-1+j)}{\sqrt{2}} \end{bmatrix}$$

$$W_4 = \frac{1}{\sqrt{4}} H_3(4,4) = \quad [\text{Eqn. 13}]$$

$$\frac{1}{\sqrt{4}} \begin{bmatrix} 1 & 1 & 1 & 1 \\ \frac{(-1+j)}{\sqrt{2}} & \frac{(1-j)}{\sqrt{2}} & \frac{(-1+j)}{\sqrt{2}} & -\frac{(1-j)}{\sqrt{2}} \\ j & j & -j & -j \\ \frac{(-1-j)}{\sqrt{2}} & \frac{(1+j)}{\sqrt{2}} & \frac{(1+j)}{\sqrt{2}} & \frac{(-1-j)}{\sqrt{2}} \end{bmatrix}$$

The set of designed base matrices consists of four matrices, $W_1$, $W_2$, $W_3$ and $W_4$. Among the sixty-four (64) entries of all the base matrices, forty-eight (48) elements are Quadrature Phase Shift Keying (QPSK) alphabets, $\{\pm 1, \pm j\}$ and sixteen (16) elements are $$\left\{ \pm \frac{(1+j)}{\sqrt{2}}, \pm \frac{(-1+j)}{\sqrt{2}} \right\}$$

alphabets. In terms of CQI calculation overhead, the codebook computes the quantity $HF_i$ for $i=1, \ldots 16$ for rank one, where $F_i$ denotes the precoding matrix and H denotes the channel matrix. The previously computed values are reused for the other ranks. This computation is possible because all of the lower rank codewords are reused for constructing higher rank codewords and the 4-bit rank one (Rank1) codewords are chosen in the four 4×4 base matrices, $W_1$, $W_2$, $W_3$ and $W_4$.

In another embodiment, a 4-bit 8 TX codebook with 8-PSK alphabet using the above unitary matrix construction method is generated. Also given the nested property incorporated with rank adaptation, the matrix generator 420 constructs the 8 TX transmit precoder 325 as a column subset of the unitary base matrix. For the 8 TX case, the matrix generator 420 applies the two-stage complex Hadamard transformation 600 to generate a set of eight by eight (8×8) base matrices. For the illustration, the two-stage transformation 600 is redefined in Equation 14 below:

$$H_{i,k,l}(T_{m1}, T_{m2}, T_{m3}, T_{m4}) \equiv H_{i,k,l}(m1, m2, m3, m4) \quad \text{[Eqn. 14]}$$
$$= (T_i(:, 1) \otimes [H_k(m1, m2)],$$
$$T_i(:, 2) \otimes [H_l(m3, m4)])$$
$$= H_i(H_k(m1, m2), H_l(m3, m4))$$

FIG. 8 illustrates a first Codebook according to embodiments of the present disclosure. Codebook1 800 is a 4-bit 8 TX codebook. The matrix generator 420 constructs Codebook1 800 based on two 8×8 base matrices. Codebook1 800 is designed for 8 TX single-polarized (SP) antennas. The matrix generator 420 constructs Codebook1 800 such that Codebook1 800 includes a minimum number of base matrices, i.e., two base matrices. The mapping from the base matrix to codeword further is illustrated in FIG. 8.

The entries of two base matrices are given by Equations 15 and 16 below:

$$W_1 = \frac{1}{\sqrt{8}} H_{1,1,1}(1, 1, 1, 1) = \frac{1}{\sqrt{8}} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{[Eqn. 15]}$$

$$W_2 = \frac{1}{\sqrt{8}} H_{3,3,3}(3, 3, 3, 3) = \frac{1}{\sqrt{8}} \begin{bmatrix} 1 & 1 & 1 & 1 & 1 & 1 & 1 & 1 \\ j & -j & j & -j & j & -j & j & -j \\ j & j & -j & -j & j & j & -j & -j \\ -1 & 1 & 1 & -1 & -1 & 1 & 1 & -1 \\ j & j & j & j & -j & -j & -j & -j \\ -1 & 1 & -1 & 1 & 1 & -1 & 1 & -1 \\ -1 & -1 & 1 & 1 & 1 & 1 & -1 & -1 \\ -j & j & j & -j & j & -j & -j & j \end{bmatrix} \quad \text{[Eqn. 16]}$$

Codebook1 800 includes the QPSK alphabet and the codewords are extracted from two 8×8 unitary base matrices. The base matrices are designed using the two-stage complex Hadamard transformations 600. In regards to CQI calculation, the codebook computes the quantity $HF_i$ for $i=1, \ldots 16$ for rank1 precoder $F_i$, where $F_i$ denotes the preceding matrix and H denotes the channel matrix. The previously computed values are reused for the other ranks.

FIG. 9 illustrates a second Codebook according to embodiments of the present disclosure. Codebook2 900 is a 4-bit 8 TX codebook. The matrix generator 420 constructs Codebook2 900 based on two 8×8 base matrices. Codebook2 900 is designed for 8 TX dual-polarized (DP) antennas. The matrix generator 420 constructs Codebook2 900 such that Codebook2 900 includes a minimum number of base matrices, i.e., two base matrices. The mapping from the base matrix to codeword is illustrated in FIG. 9.

The entries of two base matrices are given by Equations 17 and 18 below:

$$W_1 = \frac{1}{\sqrt{8}} H_{1,1,3}(1, 3, 2, 4) = \frac{1}{\sqrt{8}} \begin{bmatrix} 1 & 1 & 1 & 1 & 1 & 1 & 1 & 1 \\ 1 & -1 & j & -j & \frac{(1+j)}{\sqrt{2}} & -\frac{(1+j)}{\sqrt{2}} & \frac{(-1+j)}{\sqrt{2}} & -\frac{(-1+j)}{\sqrt{2}} \\ 1 & 1 & -1 & -1 & j & j & -j & -j \\ 1 & -1 & -j & j & \frac{(-1+j)}{\sqrt{2}} & -\frac{(-1+j)}{\sqrt{2}} & \frac{(1+j)}{\sqrt{2}} & -\frac{(1+j)}{\sqrt{2}} \\ 1 & 1 & 1 & 1 & -1 & -1 & -1 & -1 \\ 1 & -1 & j & -j & -\frac{(1+j)}{\sqrt{2}} & \frac{(1+j)}{\sqrt{2}} & -\frac{(-1+j)}{\sqrt{2}} & \frac{(-1+j)}{\sqrt{2}} \\ 1 & 1 & -1 & -1 & -j & -j & j & j \\ 1 & -1 & -j & j & -\frac{(-1+j)}{\sqrt{2}} & \frac{(-1+j)}{\sqrt{2}} & -\frac{(1+j)}{\sqrt{2}} & \frac{(1+j)}{\sqrt{2}} \end{bmatrix} \quad \text{[Eqn. 17]}$$

-continued $$W_2 = \frac{1}{\sqrt{8}} H_{3,2,4}(1,3,2,4) = \frac{1}{\sqrt{8}} \begin{bmatrix} 1 & 1 & 1 & 1 & 1 & 1 & 1 & 1 \\ 1 & -1 & j & -j & \frac{(1+j)}{\sqrt{2}} & -\frac{(1+j)}{\sqrt{2}} & \frac{(-1+j)}{\sqrt{2}} & -\frac{(-1+j)}{\sqrt{2}} \\ \frac{(1+j)}{\sqrt{2}} & \frac{(1+j)}{\sqrt{2}} & -\frac{(1+j)}{\sqrt{2}} & -\frac{(1+j)}{\sqrt{2}} & \frac{(-1+j)}{\sqrt{2}} & \frac{(-1+j)}{\sqrt{2}} & -\frac{(-1+j)}{\sqrt{2}} & -\frac{(-1+j)}{\sqrt{2}} \\ \frac{(1+j)}{\sqrt{2}} & -\frac{(1+j)}{\sqrt{2}} & -\frac{(-1+j)}{\sqrt{2}} & \frac{(-1+j)}{\sqrt{2}} & -1 & 1 & j & -j \\ j & j & j & j & -j & -j & -j & -j \\ j & -j & -1 & 1 & -\frac{(-1+j)}{\sqrt{2}} & \frac{(-1+j)}{\sqrt{2}} & \frac{(1+j)}{\sqrt{2}} & -\frac{(1+j)}{\sqrt{2}} \\ \frac{(-1+j)}{\sqrt{2}} & \frac{(-1+j)}{\sqrt{2}} & -\frac{(-1+j)}{\sqrt{2}} & -\frac{(-1+j)}{\sqrt{2}} & \frac{(1+j)}{\sqrt{2}} & \frac{(1+j)}{\sqrt{2}} & -\frac{(1+j)}{\sqrt{2}} & -\frac{(1+j)}{\sqrt{2}} \\ \frac{(-1+j)}{\sqrt{2}} & -\frac{(-1+j)}{\sqrt{2}} & \frac{(1+j)}{\sqrt{2}} & -\frac{(1+j)}{\sqrt{2}} & j & -j & 1 & -1 \end{bmatrix}$$
[Eqn. 18]

Codebook2 900 includes a 8-PSK alphabet. Among the one-hundred twenty-eight (128) entries of the two base matrices $W_1$ and $W_2$, eighty (80) entries are $\{1,\pm j\}$ and forty-eight (48) entries are $$\left\{\pm\frac{(1+j)}{\sqrt{2}},\pm\frac{(-1+j)}{\sqrt{2}}\right\}.$$

In regards to CQI calculation, the codebook computes the quantity $HF_i$ for $i=1, \ldots 16$ for rank1 precoder $F_i$, where $F_i$ denotes the precoding matrix and H denotes the channel matrix. The previously computed values are reused for the other ranks.

FIG. 10 illustrates a third Codebook according to embodiments of the present disclosure. Codebook3 1000 is a 4-bit 8 TX codebook. The matrix generator 420 constructs Codebook3 1000 from four 8×8 base matrices. Codebook3 1000 is designed to work with both SP and DP antennas configurations. The codewords are selected from the columns of four base matrices. The mapping from the base matrix to codeword is illustrated in FIG. 10.

Codebook3 1000 includes 8-PSK alphabet. Among the two-hundred fifty-six (256) entries of the four base matrices $W_1$, $W_2$, $W_3$ and $W_4$, one-hundred ninety-two (192) entries are $\{\pm 1,\pm j\}$ and sixty-four (64) entries are $$\left\{\pm\frac{(1+j)}{\sqrt{2}},\pm\frac{(-1+j)}{\sqrt{2}}\right\}.$$

In regards to CQI calculation, Codebook3 1000 computes the quantity $HF_i$ for $i=1, \ldots 16$ for rank2 precoder $F_i$, where $F_i$ denotes the precoding matrix and H denotes the channel matrix. The previously computed values are reused for the other ranks.

FIG. 11 illustrates a fourth Codebook according to embodiments of the present disclosure. Codebook4 1100 is a 4-bit 8 TX codebook. The matrix generator 420 constructs Codebook4 1100 from eight 8×8 base matrices. Codebook4 1100 is designed to work with both SP and DP antennas configurations. The codewords are selected from the columns of eight base matrices. The mapping from the base matrix to codeword is illustrated in FIG. 11.

Codebook4 1100 consists of 8-PSK alphabet. Among the five-hundred twelve (512) entries of eight base matrices $W_1$, $W_2$, $W_3$, $W_4$, $W_5$, $W_6$, $W_7$ and $W_8$, two-hundred eighty-eight (288) entries are $\{\pm 1,\pm j\}$ and two-hundred twenty-four (224) entries are $$\left\{\pm\frac{(1+j)}{\sqrt{2}},\pm\frac{(-1+j)}{\sqrt{2}}\right\}.$$

FIGS. 12 and 13 illustrate first and second column subset assignments of Codebook2 900 according to embodiments of the present disclosure. Using the one-stage CH transformation 500, the first base matrix of Codebook2 900 is generated. With the embedded structure of CH transformation, the matrix generator 420 generates the base matrix candidates including 8-PSK alphabets by rotating $W_1$. These candidate base matrices form a feasible set W as defined by Equation 19.

$$W=\{W_1, \Theta_1 W_1, \Theta_2 W_1, \ldots, \Theta_P W_1\} \quad \text{[Eqn. 19]}$$

The feasible set W has a size of P+1. The Feasible set indicates the set where our objective functions (i.e., minimum chordal distance criterion and/or array manifold response criterion) are optimized over such that an optimal set of base matrices is generated. The structure of the rotational matrix is constrained as the row-wise rotation matrix $\Theta_i$ in order to maintain the 8-PSK alphabet property. This is illustrated in Equation 20 below:

$$\Theta_i = \text{diag}(\exp(j2\pi[n_{i1}, n_{i2}, n_{i3}, n_{i4}, n_{i5}, n_{i6}, n_{i7}, n_{i8}]/8)) \quad \text{[Eqn. 20]}$$

In Equation 20, $n_{ij} \in \{1, 2, \ldots, 8\}$. With this structure, generating a whole feasible set with all possible combinations of $n_{ij}$ produces a large searching space size. Considering the structure of the CH transformation, the size of the feasible set can be decreased.

In some embodiments, the matrix generator 420 is configured to use a row-wise rotation matrix structure based on the structure of the CH transformation. Three partial rotation matrices are defined by Equations 21, 22 and 23.

$$\Theta_{i1} = \text{diag}(\exp(j2\pi[0, 0, 0, 0, k_{i1}, k_{i1}, k_{i1}, k_{i1}]/8)) \quad \text{[Eqn. 21]}$$

$$\Theta_{i2} = \text{diag}(\exp(j2\pi[0, 0, k_{i1}, k_{i2}, 0, 0, k_{i1}, k_{i2}]/8)) \quad \text{[Eqn. 22]}$$

$$\Theta_{i3} = \text{diag}(\exp(j2\pi[0, k_{i3}, 0, k_{i3}, 0, k_{i3}, 0, k_{i3}]/8)) \quad \text{[Eqn. 23]}$$

In Equations 21, 22, and 23 $k_{ij} \in \{1, 2, \ldots, 8\}$. Then, a row-wise radiation $\Theta_i$ is defined as the composition of three partial rotation matrices as illustrated by Equations 24 and 25.

$$\Theta_i = \Theta_{i1} \Theta_{i2} \Theta_{i3} \quad \text{[Eqn. 24]}$$

$$\Theta_i = \mathrm{diag}(\exp(j2\pi[0, k_{i3}, k_{i2}, k_{i2}+k_{i3}, k_{i1}+k_{i3}, k_{i1}+k_{i2}, k_{i1}+k_{i2}+k_{i3}]/8)) \quad \text{[Eqn. 25]}$$

Therefore, for a combination of $k_{i1}$, $k_{i2}$, and $k_{i3}$, a rotation matrix with a decreased searching space is obtained. By generating the feasible set and searching the optimal base matrix, the matrix generator 420 is configured to determine a set of optimal 4-bit 8 TX base matrices as defined by Equations 26 and 27 below:

$$w_1 = \frac{1}{\sqrt{8}} H_{1,1,3}(1, 3, 2, 4) \quad \text{[Eqn. 26]}$$

$$w_2 = \Theta_1 w_1 \quad \text{[Eqn. 27]}$$
$$w_2 = \mathrm{diag}(\exp(j2\pi[0, 0, 1, 1, 2, 2, 3, 3])) w_1$$
$$w_1 = \frac{1}{\sqrt{8}} H_{3,2,4}(1, 3, 2, 4)$$

In Equations 26 and 27, $k_1 = 2$, $k_2 = 1$ and $k_3 = 0$.

Embodiments of the present disclosure provide codebook design methodology and codebooks to be utilized in 4 TX and 8 TX precoding based closed-loop SU-MIMO systems in 3GPP LTE Advanced and IEEE 802.16m standards. The embodiments of this disclosure are readily incorporated either in 3GPP LTE Advanced, IEEE 802.16m, and future evolutions of these standards.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A device for generating a codebook to transmit and receive data to and from a plurality of subscriber stations via a multiple input, multiple output (MIMO) system, the device comprising:
  a codebook generator configured to generate a precoding codebook using an 8-phase shift keying (PSK) alphabet-based 4 bit 4 transmitter and 8 transmitter antennas for a closed-loop SU-MIMO scheme, wherein at least one codebook is

| Base Matrix | CW Index | Rank 1 | Rank 2 | Rank 3 |
|---|---|---|---|---|
| $W_1 =$ | 1 | $W_1(:,1)$ | $W_1(:,1\,5)$ | $W_1(:,1\,3\,5)$ |
| $\frac{1}{\sqrt{8}} H_{1,1,1}(1,1,1,1)$ | 2 | $W_1(:,2)$ | $W_1(:,2\,4)$ | $W_1(:,1\,2\,4)$ |
|  | 3 | $W_1(:,3)$ | $W_1(:,1\,3)$ | $W_1(:,1\,2\,3)$ |
|  | 4 | $W_1(:,4)$ | $W_1(:,4\,8)$ | $W_1(:,1\,2\,3)$ |
|  | 5 | $W_1(:,5)$ | $W_1(:,5\,7)$ | $W_1(:,1\,4\,8)$ |
|  | 6 | $W_1(:,6)$ | $W_1(:,2\,6)$ | $W_1(:,5\,6\,7)$ |
|  | 7 | $W_1(:,7)$ | $W_1(:,3\,7)$ | $W_1(:,2\,4\,6)$ |
|  | 8 | $W_1(:,8)$ | $W_1(6\,8)$ | $W_1(:,2\,3\,7)$ $5\,6\,8)$ |
| $W_2 =$ | 9 | $W_2(:,1)$ | $W_2(:,1\,3)$ | $W_2(:,1\,3\,5)$ |
| $\frac{1}{\sqrt{8}} H_{3,3,3}(3,3,3,3)$ | 10 | $W_2(:,2)$ | $W_2(:,2\,4)$ | $W_2(:,2\,4\,6)$ |
|  | 11 | $W_2(:,3)$ | $W_2(:,3\,5)$ | $W_2(:,2\,4\,6)$ |
|  | 12 | $W_2(:,4)$ | $W_2(:,4\,6)$ | $W_2(:,4\,6\,8)$ |
|  | 13 | $W_2(:,5)$ | $W_2(:,5\,7)$ | $W_2(:,1\,5\,7)$ |
|  | 14 | $W_2(:,6)$ | $W_2(:,6\,8)$ | $W_2(:,2\,6\,8)$ |
|  | 15 | $W_2(:,7)$ | $W_2(:,1\,7)$ | $W_2(:,1\,3\,7)$ |
|  | 16 | $W_2(:,8)$ | $W_2(:,2\,8)$ | $W_2(:,2\,4\,8)$ |

| Base Matrix | CW Index | Rank 4 | Rank 5 | Rank 6 |
|---|---|---|---|---|
| $W_1 =$ | 1 | $W_1(:,1357)$ | $W_1(:,12357)$ | $W_1(:,123567)$ |
| $\frac{1}{\sqrt{8}} H_{1,1,1}(1,1,1,1)$ | 2 | $W_1(:,1247)$ | $W_1(:,12478)$ | $W_1(:,124578)$ |
|  | 3 | $W_1(:,1234)$ | $W_1(:,12345)$ | $W_1(:,123457)$ |
|  | 4 | $W_1(:,1458)$ | $W_1(:,14568)$ | $W_1(:,124568)$ |
|  | 5 | $W_1(:,5678)$ | $W_1(:,15678)$ | $W_1(:,135678)$ |
|  | 6 | $W_1(:,2468)$ | $W_1(:,24678)$ | $W_1(:,124678)$ |
|  | 7 | $W_1(:,2367)$ | $W_1(:,23467)$ | $W_1(:,234678)$ |
|  | 8 | $W_1(:,2367)$ $3568)$ | $W_1(:,23467)$ $34568)$ | $W_1(:,234678)$ $134568)$ |
| $W_2 =$ | 9 | $W_2(:,1357)$ | $W_2(:,12357)$ | $W_2(:,123567)$ |
| $\frac{1}{\sqrt{8}} H_{3,3,3}(3,3,3,3)$ | 10 | $W_2(:,2468)$ | $W_2(:,23468)$ | $W_2(:,234678)$ |
|  | 11 | $W_2(:,3457)$ | $W_2(:,34567)$ | $W_2(:,134567)$ |
|  | 12 | $W_2(:,4678)$ | $W_2(:,14678)$ | $W_2(:,124678)$ |
|  | 13 | $W_2(:,1257)$ | $W_2(:,12567)$ | $W_2(:,124567)$ |
|  | 14 | $W_2(:,2678)$ | $W_2(:,23678)$ | $W_2(:,123678)$ |
|  | 15 | $W_2(:,1237)$ | $W_2(:,12378)$ | $W_2(:,123578)$ |
|  | 16 | $W_2(:,2348)$ | $W_2(:,23458)$ | $W_2(:,234568)$ |

| Base Matrix | CW Index | Rank 7 | Rank 8 |
|---|---|---|---|
| $W_1 =$ | 1 | $W_1(:,1234567)$ | $W_1(:,12345678)$ |
| $\frac{1}{\sqrt{8}} H_{1,1,1}(1,1,1,1)$ | 2 | $W_1(:,1245678)$ | n/a |
|  | 3 | $W_1(:,1234578)$ | n/a |
|  | 4 | $W_1(:,1234568)$ | n/a |
|  | 5 | $W_1(:,1235678)$ | n/a |
|  | 6 | $W_1(:,1234678)$ | n/a |
|  | 7 | $W_1(:,2345678)$ | n/a |
|  | 8 | $W_1(:,2345678)$ $1345678)$ | n/a |

-continued

| $W_2 = \frac{1}{\sqrt{8}} H_{3,3,3}(3,3,3,3)$ | | $W_2$ (:, 1234567) | $W_2$ (:, 12345678) |
|---|---|---|---|
| | 9 | | |
| | 10 | $W_2$ (:, 2345678) | n/a |
| | 11 | $W_2$ (:, 1345678) | n/a |
| | 12 | $W_2$ (:, 1234678) | n/a |
| | 13 | $W_2$ (:, 1245678) | n/a |
| | 14 | $W_2$ (:, 1235678) | n/a |
| | 15 | $W_2$ (:, 1234578) | n/a |
| | 16 | $W_2$ (:, 1234568) | n/a. |

2. A method for generating a codebook to transmit and receive data via a multiple input, multiple output (MIMO) antenna system, the method comprising:

using an 8- phase shift keying (PSK) alphabet-based 4 bit 4 transmitter and 8 transmitter antennas precoding codebook used for closed-loop SU-MTMO scheme, wherein at least one codebook is generated using a first Equation and a second Equation, wherein the first Equation is:

$$T_i = \begin{bmatrix} 1 & 1 \\ e^{j2\pi(i-1)/M} & -e^{j2\pi(i-1)/M} \end{bmatrix} \text{ for } i = 1, 2, \ldots, M/2$$

and wherein the second Equation is:

$$H_i(V_1, V_2) \equiv (T_i \otimes I_m)[I_2(:,1) \otimes V_1, I_2(:,2) \otimes V_2]$$

$$= [T_i(:,1) \otimes V_1, T_i(:,2) \otimes V_2]$$

$$= W_i^{(1)};$$

where $V_1$ and $V_2$, are generating matrices, $I_m$ denotes the m-dimensional identity matrix, $H_i, (V_1, V_2) \in U^{2m \times 2n}$ and superscript in the resulting matrix $W_i^{(1)}$ denotes the number of the transformation stages.

3. A method for generating a codebook to transmit and receive data via a multiple input, multiple output (MIMO) antenna system, the method comprising:

using an 8- phase shift keying (PSK) alphabet-based 4 bit 4 transmitter and 8 transmitter antennas precoding codebook used for closed-loop SU-MIMO scheme, wherein at least one codebook is generated using eight 8×8 base matrices, wherein at least one of the base matrices is defined by at least one of.

$$w_1 = \frac{1}{\sqrt{8}} H_{1,1,3}(1,3,2,4)$$

and $$w_2 = \Theta_1 w_1$$

$$w_2 = \text{diag}(\exp(j2\pi[0,0,1,1,2,2,3,3]))w_1$$

$$w_1 = \frac{1}{\sqrt{8}} H_{3,2,4}(1,3,2,4).$$

* * * * *